UNITED STATES PATENT OFFICE.

ERIK OLOF TAFLIN, OF STOCKHOLM, SWEDEN.

MEDICINAL FOOD AND METHOD OF PREPARING SAME.

SPECIFICATION forming part of Letters Patent No. 525,818, dated September 11, 1894.

Application filed May 1, 1894. Serial No. 509,700. (No specimens.)

*To all whom it may concern:*

Be it known that I, ERIK OLOF TAFLIN, a subject of the King of Sweden and Norway, residing at Stockholm, in the Kingdom of Sweden, have invented certain new and useful Improvements in Prepared Foods and Methods of Preparing the Same; and I do hereby declare that the following is a full, clear, and exact description thereof, which will enable others skilled in the art to which it appertains to make and use the same.

This invention relates to a prepared food and to a method of preparing a food which contains as essential ingredients the principal constituents of hempseed and malt. It is well known that hempseed contains ingredients which have valuable curative properties. The internal use of hempseed or hempseed extract is, however, attended with difficulties, partly by reason of the presence in the seed of a substance having a bitter and disagreeable taste.

My invention has for its object to prepare a wholesome and nutritious food which contains the desirable properties of hempseed and malt and which at the same time has an agreeable taste.

In producing my improved food, a liquid extract of hempseed is first prepared by crushing the hempseed and then extracting the soluble ingredients thereof by means of petroleum ether. In preparing the malt to be mixed with this extract, the same is preferably dried at a comparatively low temperature, say from 50° to 60° centigrade and the malting operations are carried on slowly and continued for a longer period than by the ordinary method of making malt, so as to extract the greatest possible quantity of malt-sugar therefrom. Wheat and maize or Indian corn are the grains best suited for producing this malt. A portion of the malt thus obtained is mashed or steeped in hot water for extracting the most digestible and active constituents of the malt and this solution is then evaporated to the consistency of sirup, forming the malt extract. Another portion of the malt so prepared is reduced to meal. Equal parts of the hempseed extract and malt extract are next mixed together and to this mixture is added a sufficient quantity of such malt meal to form a dough. This doughy mass is next pressed into suitable cakes which are dried and then reduced by grinding or crushing to a meal or powder, in which form the food may be put up in packages ready for use. If desired, the taste of this food may be further improved by incorporating cacao therewith. In this case, cacao powder may be mixed with the malt meal before adding the latter to the mixture of hempseed extract and malt extract, or it may be added separately before or after the meal is mixed with such extracts. If preferred, a dry powder or meal may first be prepared of hempseed extract, malt extract, and finely ground malt, as above described, and this powder may then be mixed with a suitable quantity of cacao powder; or, if desired, a powder or meal of hempseed extract, malt extract and cacao may first be prepared and the malt meal then added to this mixture. It is, however, desirable to mix the hempseed extract and malt extract first and then add the dry constituents. In certain cases the malt meal may be entirely replaced by cacao powder.

The mixture of the hempseed extract with the malt extract may be facilitated by dissolving the same in alcohol.

The proportions of the ingredients may be varied, according as the effect of either is desired to predominate. As before stated equal parts of the hempseed extract and malt extract may be employed, but a satisfactory food may be obtained by using other proportions. For instance, as many as four parts of malt extract may be mixed with one part of the hempseed extract, while if a stronger and more prompt effect of the hempseed is desired, the quantity of malt extract may be reduced to one fourth of the quantity of hempseed extract.

This prepared food, with or without the admixture of cacao powder, can be used instead of coffee, tea or chocolate, over which latter drinks it has the advantage of being very nutritious and digestible, and if the proportion of cacao is not excessive, it has the further advantage that it is but slightly, if at all, stimulative. The food is especially desirable for children. In using the food, it is diluted with hot water or milk in the same way as the cacao powder now commonly used, but the food may also be added to tea, coffee, and other drinks.

I claim as my invention—

1. A medicinal food in the form of a powder consisting of malt meal impregnated with extracts of malt and of hempseed, substantially as described.

2. The herein described method of producing a prepared food which consists in mixing together an extract of hempseed, an extract of malt, and malt meal, drying the mixture and finally reducing the same to meal or powder, substantially as set forth.

3. The herein described method of producing a prepared food, which consists in mixing together hempseed extract and malt extract, adding to such mixture a sufficient quantity of pulverized malt to form a doughy mass, pressing the mass into cakes, drying the cakes and finally reducing the dried cakes to meal or powder, substantially as set forth.

In testimony whereof I have affixed my signature in presence of two witnesses.

ERIK OLOF TAFLIN.

Witnesses:
C. ALEXANDERSON,
FRITZ SWET, Sr.